United States Patent

[11] 3,591,140

[72] Inventor John C. McCoy
 Box 561, Ruidoso, N. Mex. 88345
[21] Appl. No. 797,205
[22] Filed Feb. 6, 1969
[45] Patented July 6, 1971

[54] CHAIN TOOL
 1 Claim, 3 Drawing Figs.
[52] U.S. Cl. .................................................. 254/66
[51] Int. Cl. ...................................................... B66f 3/08
[50] Field of Search ........................................... 254/66, 78, 95

[56] References Cited
UNITED STATES PATENTS
1,475,065 11/1923 Gilbertson ................... 254/66 X
1,155,520 10/1915 Shoos ............ ............ 254/66

*Primary Examiner*—Robert C. Riordon
*Assistant Examiner*—David R. Melton
*Attorney*—Robert K. Rhea ABSTRACT: A chain holding and tightening tool comprising a rack having a chain-engaging hook at one end and a sleeve slidably surrounding the rack and provided with a hook for engaging an oppositely disposed end portion of the chain. Ratchet means, supported by the sleeve in engagement with the rack, moves the chain engaging hooks toward each other.

PATENTED JUL 6 1971
3,591,140
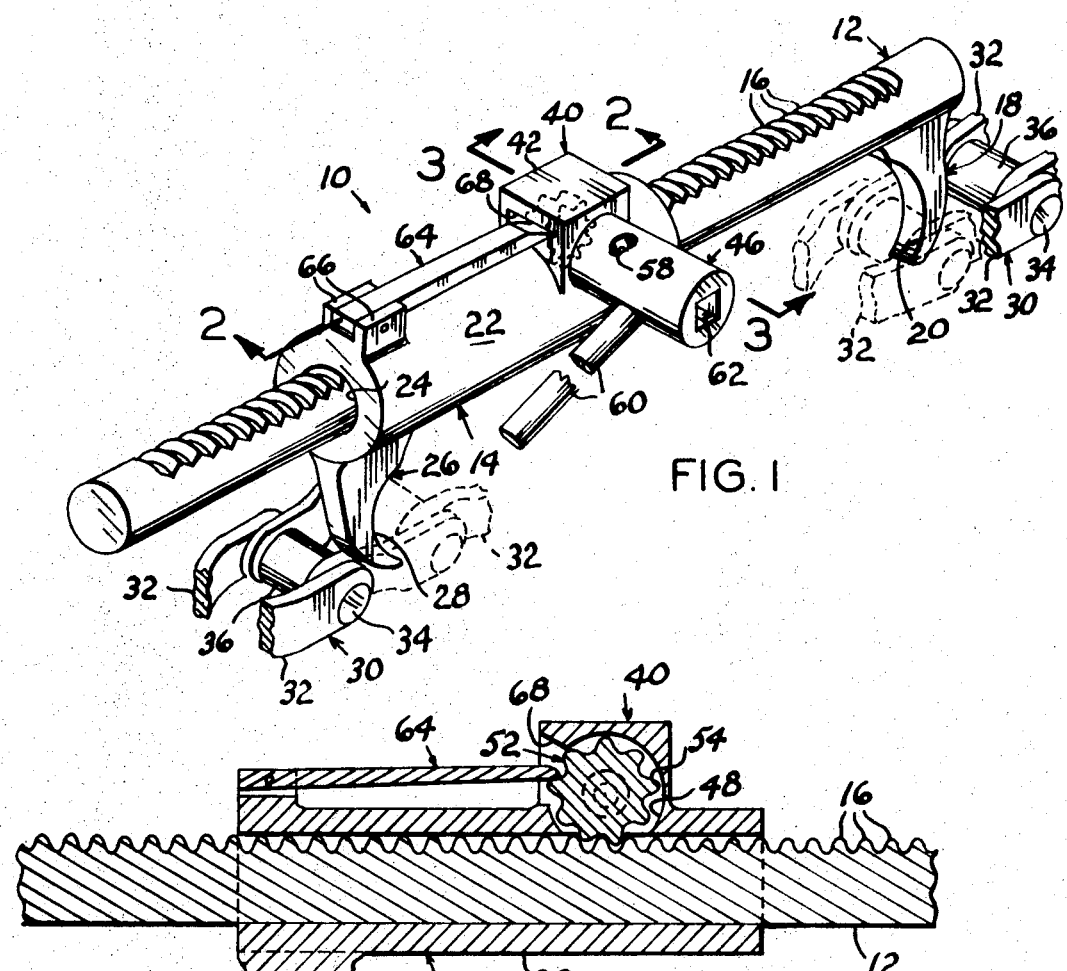
FIG. 1
FIG. 2
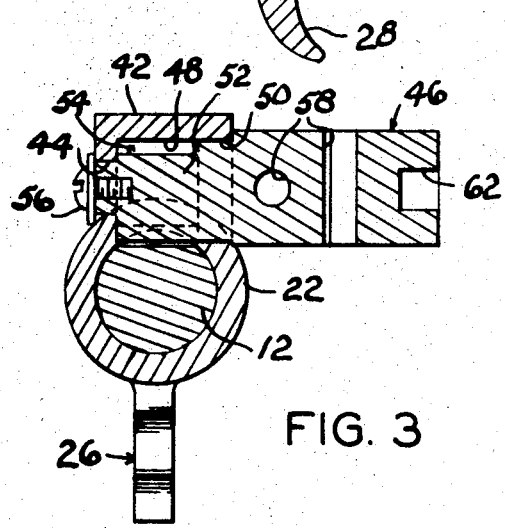
FIG. 3
JOHN C. McCOY
INVENTOR.
BY
Robert K. Rhea
AGENT 3,591,140

CHAIN TOOL

BACKGROUND OF THE INVENTION

The present invention relates to chain repair and more particularly to a tool for engaging and holding adjacent ends of substantially any type roller or flat link chain during repair, tightening or installation of the chain.

Repair work or installation of chains is more easily accomplished where a means is provided for gripping opposing end portions of the chains to maintain the chain entrained around cooperating sprockets or the like. This is particularly true where the chain is of relatively large mass having rollers or a flat link-type chain entrained around sprockets having a pitch of 4 to 6 inches. Furthermore, it is desirable to provide a means whereby opposing ends of a chain may be progressively pulled toward each other and held in proximity for replacing broken links, or the like, or the installation of a master link. In repairing such a chain it is necessary that the tool, or means gripping adjacent ends of the chain, be positioned in offset relation with respect to the chain to allow clearance for its repair or replacement of links, or the like.

The present invention provides an elongated rack and sleeve member slidably surrounding the rack, each respectively provided with a cooperating chain engaging hook so that a ratchet-type cog wheel, supported by the sliding sleeve, will engage the rack teeth and progressively draw opposing end portions of a chain toward each other when the cog wheel is rotated.

SUMMARY OF THE INVENTION

An elongated rack is provided at one end portion with a laterally extending hooklike chain link engaging member. A sleeve slidably surrounds the rack and is provided at one end portion with a laterally extending hook member for cooperatively engaging an opposite end portion of the chain. A ratchet-type cog wheel is rotatably supported by the sleeve in engagement with the teeth of the rack so that rotation of the cog wheel along the teeth of the rack progressively moves the cooperating hooks toward and way from each other. The laterally extending hook members positions the longitudinally extending axis of the rack and sleeve in laterally offset relation with respect to the plane defined by and extending between opposing end portions of the chain.

The principal object of this invention is to provide a chain end portion engaging tool for holding opposite end portions of a chain during repair, tightening or installation.

BRIEF DESCRIPTION OF THE DRAWINGS

FIG. 1 is a perspective view of the tool operatively connected with fragmentary end portions of a chain; and, FIGS. 2 and 3 are vertical cross-sectional views taken substantially along the lines 2–2 and 3–3, respectively, of FIG. 1.

DESCRIPTION OF THE PREFERRED EMBODIMENT

Like characters of reference designate like parts in those figures of the drawings in which they occur.

In the drawings:

The reference numeral 10 indicates the device, as a whole, comprising a rack 12 and sleeve means 14. The rack 12 is elongated rodlike and is shown round in cross section but may be of any other cross section desired. The rack may be of any other cross section desired. The rack may be of any desired length but is preferably approximately 1½feet having a selected diameter to provide sufficient resistance to distortion in accordance with the mass of the chain with which the tool is used, as hereinafter described.

The rack 12 is provided with a series of longitudinally extending teeth 16. A substantially hook-shaped member 18 is connected to one end of the rack in laterally projecting relation defining an arcuate curve 20 projecting toward the other end of the rack.

The sleeve means 14 comprises a sleeve member 22 of selected length having a bore 24 slidably surrounding the rack at its end portion opposite the hook 18. One end of the sleeve, preferably at that end opposite the rack hook 18, is provided with a laterally extending similarly shaped hook 26 defining an arcuate surface 28 projecting cooperatively toward and aligned with the rack hook 18. The purpose of the hooks 18 and 26 is for partially entering and engaging opposing end portions of a chain 30 normally entrained around two or more sprockets, not shown.

The chain 30 is conventional and is provided with links 32 which are secured in spaced-apart overlapping relation by a pin 34 having a surrounding sleevelike roller 36 interposed between opposing links. The hooks 18 and 26 are inserted into the oppositely disposed end portions of the chain 30 between opposing side links 32 and pairs of the rollers 36 so that the arcuate surfaces 20 and 28, of the respective hooks, cooperatively engage, respectively, a peripheral portion of one of the rollers 36.

Thus, movement of the sleeve means 14, along the rack toward the rack hook 18, move or draw the oppositely disposed end portions of the chain 30 toward each other. This is accomplished by ratchet means 40 mounted on and forming a part of the sleeve means 14. The sleeve is provided with an upstanding protrusion or boss 42 having a bore 44 perpendicular to the longitudinal axis of the sleeve which journals a reduced end portion of a shaft 46 projecting into the boss 42. The boss 42 is counterbored, as at 48, on a diameter great enough to intersect the bore 24 of the sleeve and provide communication between the counterbore 48 and the rack teeth 16. The counterbore 48 also forms a bearing 50 which journals a portion of the shaft 46. The shaft is provided with or connected to a cog wheel 52 within the counterbore 48. The cog wheel 52 has a plurality of teeth 54 for cooperative engagement with the rack teeth 16. The shaft 46 and cog wheel 52 are maintained in assembled relation within the boss 42 by a bolt or screw 56 coaxially secured to the end portion of the shaft 46 projecting into the bore 44. The other or free end portion of the shaft 46 projects laterally of the boss 42 and is provided with transverse bores 58 for receiving a rod 60, or the like, which forms a lever to rotate the shaft 46 about its longitudinal axis and similarly rotate the cog wheel 52 which moves the sleeve means 14 along the rack. The free end surface of the shaft 46 is also provided with an inwardly extending socket 62 for receiving a wrench drive, not shown, for the purpose of rotating the shaft 46.

The sleeve means 14 is maintained in a selected position longitudinally of the rack by a locking pawl 64. The locking pawl 64 is pivotally connected between upstanding ears 66 formed on the end portion of the sleeve 22 opposite its hook 26. The other end of the pawl 64 projects through a suitable opening 68 formed in the wall of the boss 42 so that the free end of the pawl 64 is disposed between adjacent ones of the cog wheel teeth 54 to lock the cog wheel and prevent separating movement of the hooks 18 and 26.

OPERATION

In operation the device 10 is connected with oppositely disposed end portions of the chain 30, to be repaired or installed, with the hooks 18 and 26 respectively engaging one of the chain rollers 36 as described hereinabove. The longitudinal axis of the rack and sleeve is thus disposed in offset relation with respect to the plane defined by and extending between the ends of the chain to provide clearance for working on the chain.

The sleeve means 14 is moved toward the hook-equipped end of the rack 12 by rotating the shaft 46, as by the use of the rod 60, so that the cog wheel teeth 54 engaging the rack teeth 16 progressively draws the chain end portions toward each other. The sleeve is maintained in this position by the pawl 64 interposed between the cog wheel teeth and contacting the adjacent surface of the sleeve 22.

When it is desired to release the chain end members or remove the device 10, the cog wheel engaging end of the pawl 64 is manually lifted so that it is disposed outwardly of the circular plane defined by the rotating cog wheel teeth 54 permitting reverse rotation of the shaft 46.

Obviously the invention is susceptible to changes or alterations without defeating its practicability, therefore, I do not wish to be confined to the preferred embodiment shown in the drawings and described herein.

I claim:

1. A chain-tightening and repair tool, comprising: an elongated member having a series of longitudinally spaced-apart teeth forming a rack, said rack having a laterally projecting link chain engaging hook formed on one end portion; a sleeve longitudinally slidably surrounding said rack, said sleeve having a laterally extending link chain engaging hook cooperatively aligned with and facing toward the other said hook, said sleeve having a laterally projecting boss intermediate its ends and opposite the hook on said sleeve, said boss having a bore with its axis perpendicular to the longitudinal axis of said sleeve and communicating with teeth of said rack, said boss having a lateral opening facing toward one end of said sleeve; a cog wheel coaxially received by the boss bore and engaging the teeth of said rack; a shaft projecting at one end portion into said boss and having a bearing surface adjacent said one end portion journaled by the surface forming the bore in said boss and being coaxially connected with and supporting said cog wheel; and a pawl pivotally mounted at one end on said sleeve and projecting, at its other end, through the lateral opening in said boss for releasably engaging said cog wheel.